United States Patent [19]
Sondee et al.

[11] Patent Number: 5,833,139
[45] Date of Patent: Nov. 10, 1998

[54] SINGLE VARIABLE FLAP EXHAUST NOZZLE

[75] Inventors: Daniel C. Sondee, Jupiter; Michael W. Kelton, Palm Beach Gardens, both of Fla.

[73] Assignee: United Technologies Corporation, Hartford, Conn.

[21] Appl. No.: 524,197

[22] Filed: Sep. 6, 1995

[51] Int. Cl.⁶ .................................................. B64C 15/02
[52] U.S. Cl. ............................. 239/265.17; 239/265.35
[58] Field of Search ..................... 239/265.17, 265.31, 239/265.33, 265.35, 265.37

[56] References Cited

U.S. PATENT DOCUMENTS

| 2,625,008 | 1/1953 | Crook | 239/265.33 |
| 2,799,989 | 7/1957 | Kappus | 239/265.37 |
| 3,261,164 | 7/1966 | Tumioki | 239/265.37 |
| 3,599,875 | 8/1971 | Wynosky | 239/265.37 |
| 4,052,007 | 10/1977 | Willard | 239/265.37 |
| 4,754,927 | 7/1988 | Fitzgerald | 239/265.17 |
| 5,016,818 | 5/1991 | Nash et al. | 239/265.35 |

*Primary Examiner*—Kevin Weldon
*Attorney, Agent, or Firm*—Charles E. Sohl

[57] ABSTRACT

A two dimensional convergent/divergent exhaust nozzle for a gas turbine engine where a first flap is stationary and a second flap is variable. The flaps have an integrated convergent/divergent design to reduce the number of exhaust nozzle components, increasing engine maintainability and simplifying the exhaust nozzle control system. The design allows fluidic vectoring to be incorporated into the exhaust nozzle by injecting high pressure air into the exhaust stream.

17 Claims, 4 Drawing Sheets

SINGLE VARIABLE FLAP EXHAUST NOZZLE

TECHNICAL FIELD

This invention relates to gas turbine engine exhaust nozzles, and more particularly, to exhaust nozzles with convergent/divergent flap configurations.

BACKGROUND OF THE INVENTION

The typical gas turbine engine exhaust nozzle has a series of flaps and seals with a convergent and divergent flap arrangement with a circular axial flow passage defined by the convergent and divergent flap assemblies. The convergent flaps are pivotable into the exhaust nozzle throat. The divergent flaps are hinged at the divergent flap leading edge and the trailing edge of the corresponding convergent flap. The divergent flap is pivotable for defining the vertical discharge vectored expansion rate of the exhaust gas stream.

The current exhaust nozzle flap assemblies comprise at least one component for each of the balance, convergent, divergent, and external flaps, with seal components for each flap assembly. The conventional exhaust nozzles comprise approximately 15 flap and seal assemblies assembled into a circular configuration, defining a circular engine exhaust passageway. In addition, the flap assemblies are actuated with approximately five pneumatic actuators located circumferentially around the outside of the exhaust nozzle. The prior art gas turbine engine exhaust nozzle designs require a trade off of increased weight and design complexity for the advantages of higher pressure ratios across the exhaust nozzle provided by the convergent/divergent exhaust nozzles. The convergent/divergent exhaust nozzle, however, is particularly advantageous for efficiently converting the pressure within the engine to velocity.

As with any aircraft application, reliability and weight are critical factors; therefore, simple and light weight designs are favored over complex and heavier designs. There is a need for a convergent/divergent exhaust nozzle with a simple design, minimizing the number of components and overall weight of the nozzle.

DISCLOSURE OF THE INVENTION

It is, therefore, an object of the present invention to provide an exhaust nozzle for a gas turbine engine with an integrated convergent and divergent flap configuration.

It is also an object of the present invention to provide an exhaust nozzle for a gas turbine engine with a simpler and light weight convergent/divergent flap design when compared to the prior art.

It is also an object of the present invention to provide an exhaust nozzle for a gas turbine engine wherein the convergent/divergent flap assemblies are controlled by internally mounted actuators.

It is also an object of the present invention to provide an exhaust nozzle for a gas turbine engine wherein there is a constant interface gap between a variable flap and a static component of the exhaust nozzle.

It is also an object of the present invention to provide an exhaust nozzle for a gas turbine engine with the exhaust nozzle having the capability for exhaust stream vectoring.

It is also an object of the present invention to provide an exhaust nozzle for a gas turbine engine wherein the exhaust stream vectoring capability is accomplished by using high pressure air injected into the engine exhaust stream, the injected air being non-parallel to the engine major axis.

It is also an object of the present invention to provide an exhaust nozzle for a gas turbine engine with a convergent/divergent flap design wherein fluidic vectoring may be accomplished by components internal of the engine and the exhaust nozzle.

According to the present invention, an exhaust nozzle in cooperation with a gas turbine engine that has an exhaust stream passageway through the exhaust nozzle along a major axis, includes two parallel and spaced apart nozzle sidewalls, a fixed flap, and a variable flap opposing the fixed flap. The flaps being parallel, spaced apart, and connecting the sidewalls so that the exhaust stream passageway is bounded and defined by the sidewalls and the flaps. The sidewalls and the flaps may be of any polygonal shape to define the passageway.

The fixed flap has a convergent portion, a downstream throat portion that is parallel with the major axis, and a further downstream divergent portion. The variable flap has a convergent portion, a downstream throat portion, and a further downstream divergent portion. The convergent, throat, and divergent portions of each flap are integrated into a single piece construction.

The fixed flap remains stationary in relation to the exhaust stream flow; the variable flap is positioned by an actuator to position the variable flap in relation to the exhaust stream flow and to vary the exhaust throat and exit areas. The exit area may vary depending on the engine operation, such as engine cruise and engine augmentation flight operations. The variable flap has a common rotation point, so that as the variable flap changes positions between engine cruise and engine augmentation, a constant interface gap exists between the variable flap and a static component of the exhaust nozzle.

The exhaust nozzle of the present invention provides an unique design for an exhaust nozzle where fluidic vectoring may be accomplished by introducing high pressure compressor discharge air through a sidewall and into the exhaust stream, the introduced air being non-parallel to the major axis. High pressure compressor air may also be introduced through a series of apertures in the flaps to align the exhaust throat area in the direction of the desired vector.

In a separate embodiment, an exhaust nozzle has the same structure as the above described exhaust nozzle except that there are two variable position flaps. Therefore, a first variable flap and a second variable flap oppose each other and control the nozzle exit area.

The exhaust nozzle may be integrated with the aircraft external surface for a smooth transition between the aircraft outer skin and the exhaust nozzle.

The exhaust nozzle of the present invention provides a simple flap design that reduces the number of components required for a convergent/divergent exhaust nozzle when compared to the prior art exhaust nozzles, therefore, reducing the weight and cost of the exhaust nozzle while improving the exhaust nozzle reliability and maintainability.

The foregoing and other advantages of the present invention will become more apparent from the following description and accompanying drawings.

BEST MODE FOR CARRYING OUT THE INVENTION

Figure 1:
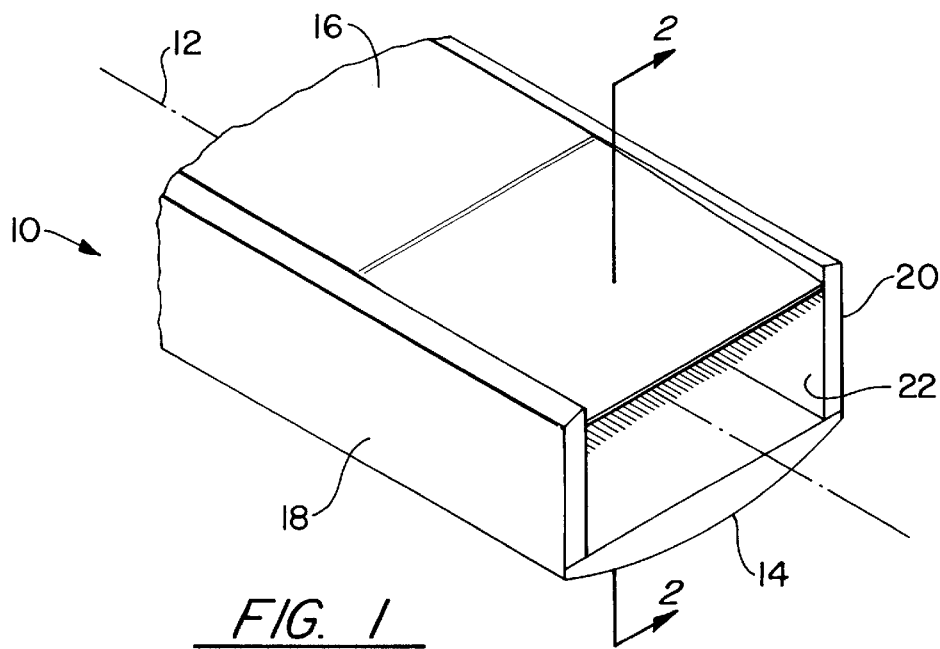
FIG. 1 is a perspective view a gas turbine engine exhaust nozzle of the present invention.

According to the present invention, and as shown in FIG. 1, an exhaust nozzle 10 for a gas turbine engine has a major axis 12, a fixed flap 14 opposite of a variable position flap 16. A first sidewall 18 and a second sidewall 20 are parallel in relation to each other and extend vertically between the fixed flap 14 and the variable position flap 16 to define an exhaust stream passageway 22.

Figure 2:
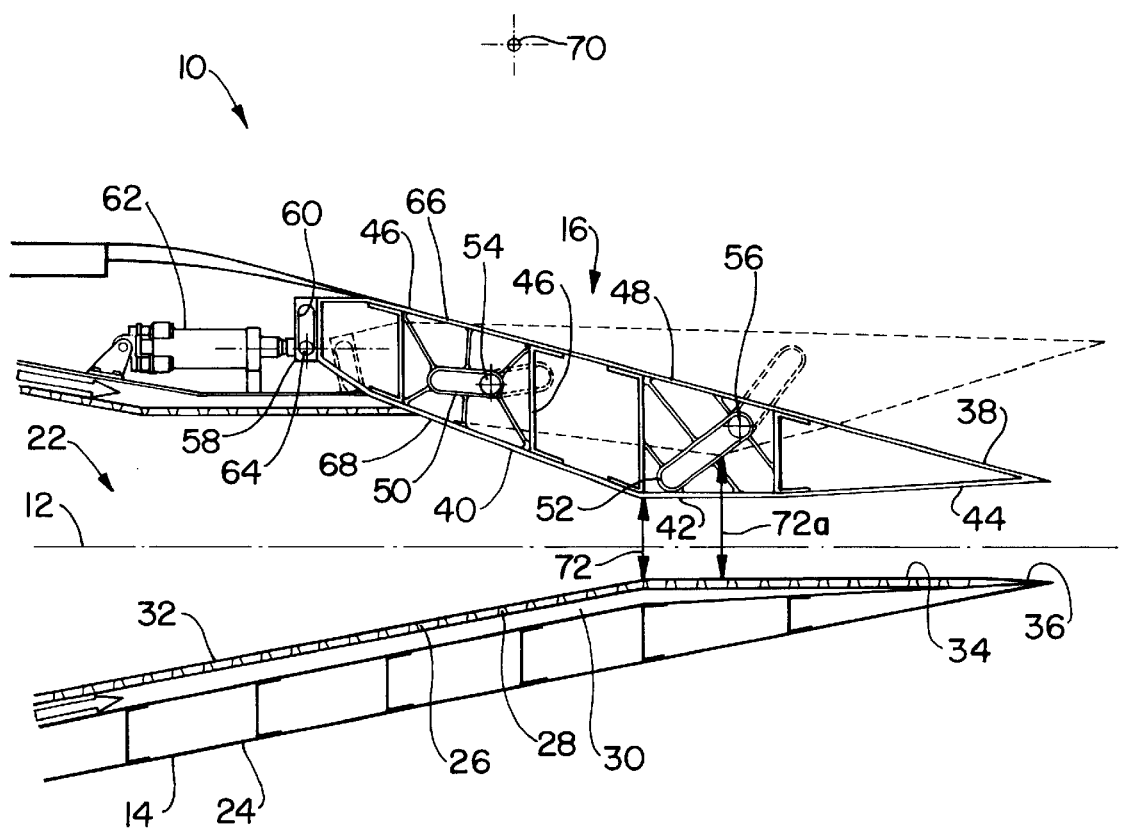
FIG. 2 is a cross sectional side view of the exhaust nozzle of the present invention at cruise power, the view taken along line 2—2 of FIG. 1.

In the preferred embodiment, and as shown in FIG. 2, the fixed flap 14 has an external wall 24 and an internal augmentor liner 26. A plurality of augmentor liner cooling holes 28 are supplied with fan bypass air, or cooling air, from a fan bypass cooling air passageway 30 for cooling the fixed flap 14.

The fixed flap 14 has a convergent portion 32, a downstream throat portion 34 that is parallel with the main axis 12, and further downstream divergent portion 36.

The variable position flap 16 has an external wall 38, a convergent portion 40, a downstream throat portion 42, and a further downstream divergent portion 44. The convergent, throat, and divergent portions of each flap are integrated into a single piece construction. The convergent portions, throat portions, and divergent portions of the variable flap and the fixed flap are axially aligned to converge the exhaust stream to the downstream throat portions, and the further downstream divergent portions are axially aligned to diverge the exhaust stream and for defining the vertical discharge vectored expansion rate of the exhaust stream after the exhaust stream passes the throat portions.

The variable position flap 16 has a series of internal C-shaped channels 46 to provide structural integrity to the variable position flap 16. A series of internal beams 48 located between the C-shaped channels 46 support a first guide track 50 and a second guide track 52. The guide tracks 50 and 52 slidably engage with a first bearing 54 and a second bearing 56 respectively. The bearings 54 and 56 are fixedly attached to one of the sidewalls 18 or 20. A second set of guide tracks and bearings may be utilized at the opposite sidewall location.

The variable position flap 16 is pivotally mounted onto the exhaust nozzle and is rotatable about its pivotal axis to an angular position so that the exhaust nozzle throat area is variable.

The variable position flap 16 has an actuator piston mount 58, which has a slot 60. An actuator 62 fixedly attached to the exhaust nozzle has an actuator bearing 64, which slidably engages the slot 60. The slot 60 houses the bearing 64 and allows the actuator 62 to move the variable position flap 16 between minimum and maximum exhaust nozzle throat openings while the actuator 62 remains in a mounted and fixed position and does not rotate while the actuator positions the variable flap. As the variable position flap 16 moves between minimum and maximum throat openings, the flap 16 follows the path of the guide tracks 50 and 52.

The variable position flap 16 interfaces with the gas turbine engine or aircraft at a first interface point 66 and a second interface point 68. An advantage of the present invention is that the variable position flap 16 rotates about a common rotation point 70 that is common with both the first and the second interface points 66 and 68, so that as the variable flap changes positions between engine cruise and engine augmentation, a constant interface gap exists between the variable flap and a static component of the exhaust nozzle. The common rotation point 70 provides a simple configuration for sealing the variable position flap 16 at the interface points 66 and 68 with the gas turbine engine or the aircraft.

The exhaust stream converges as the exhaust steam passageway 22 narrows along the flap convergent portions 32 and 40. The exhaust stream and passageway 22 are at maximum convergence when the engine is at cruise power, as depicted in FIG. 2, defining a minimum throat opening position 72. A small expansion ratio of the exhaust stream results while the engine is at cruise power.

While the engine is at maximum augmentation, the variable position flap 16 is moved to the maximum open position, as a result, the sonic line, or the initial point of maximum convergence, moves downstream along the fixed flap throat portion 34 to a maximum throat opening position 72a, which is the most narrow plane along the passageway 22 while at maximum augmentation.

The exhaust nozzle of the present invention allows the incorporation of fluidics to vector the exhaust stream away from the major axis 12 using high pressure discharge air, otherwise known as fluidics. Fluidics, when used in this context, is referring to a device that depends for operation on the pressures and flows of a fluid in a shaped passageway.

Figure 3:
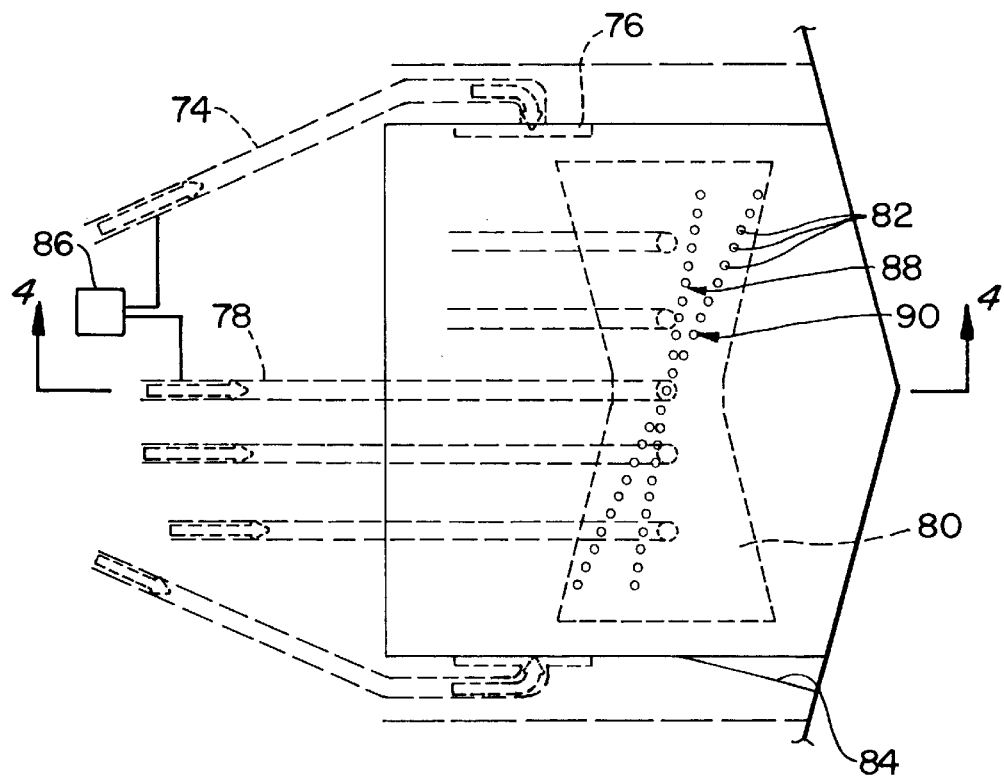
FIG. 3 is a cross sectional top view of a separate embodiment of an exhaust nozzle of the present invention, wherein fluidic vectoring may be achieved.

In a separate embodiment of the present invention, an exhaust nozzle for a gas turbine engine is similar to the above described exhaust nozzle except that fluidic vectoring may also be achieved. As shown in FIG. 3, a first compressor discharge air passageway 74 provides high pressure air to a sidewall plenum 76, where the discharge air is available for fluidic vectoring. A second compressor discharge air passageway 78 provides high pressure air to a fixed flap plenum 80, where the discharge air is available for fluidic vectoring and exhaust stream alignment in the throat area.

The high pressure discharge air is available for injection from the fixed flap plenum 80 to a series of fixed flap apertures 82 that connect the fixed flap plenum 80 to the exhaust stream passageway. The apertures 82 are aligned into a series of rows that are at an angle to align the exhaust stream at the throat area toward the sidewall opposite of the sidewall plenum 76. The opposite sidewall may have a divergent flow surface 84, which angles away from the major axis 12 to aid with vectoring the exhaust stream.

A control unit 86 activates, or energizes, a first row of fixed flap apertures 88 with high pressure air for realigning the exhaust stream slightly non-parallel to the major axis 12. The control unit 86 then deactivates the first row of fixed flap apertures 88 and then energizes a second row of fixed flap apertures 90, realigning the exhaust stream slightly more non-parallel to the major axis 12 and towards the diverging flow surface 84 to enhance fluidic vectoring.

Figure 4:
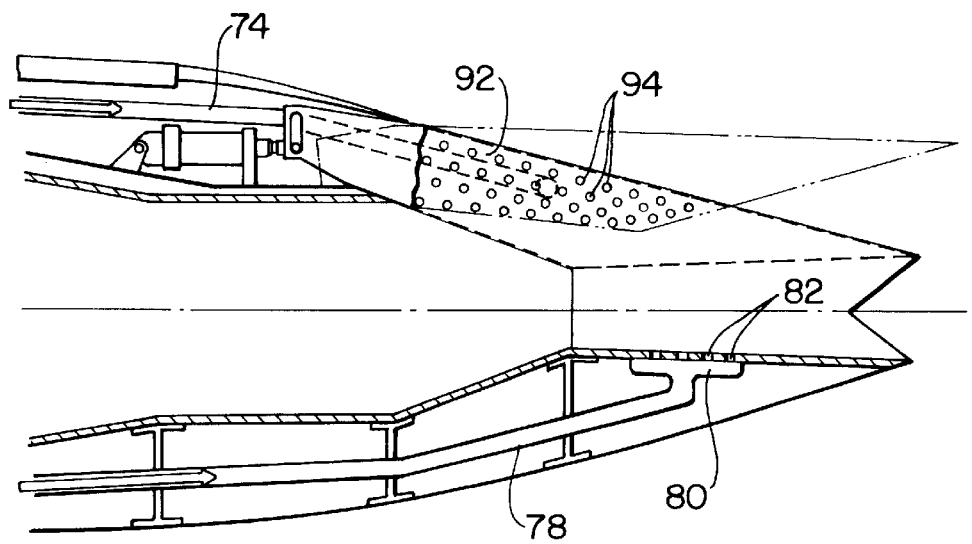
FIG. 4 is a cross sectional side view of the separate embodiment of the exhaust nozzle of the present invention, wherein fluidic vectoring may be achieved.

As shown in FIG. 4, a common sidewall area 92 is shared with the variable position flap 16, whether the flap is at the cruise position or the augmentor position. The common sidewall area 92 has a series of sidewall apertures 94 for the introduction of the high pressure discharge air into the exhaust stream from the sidewall. The high pressure discharge air is introduced into the exhaust stream with the velocity vector of the injected air being non-parallel to the velocity vector of the exhaust stream. The control unit 86 controls the introduction of the discharge air into the sidewall. The fluidic vectoring of the present invention allows the exhaust stream to be shifted from the major axis 12 to the opposing or divergent flow surface 84.

The realignment of the exhaust throat area with the fixed flap high pressure air injection and the sidewall high pressure air injection combine to allow the exhaust nozzle of the present invention to provide vectoring with the use of fluidics. The present invention describes a simplified exhaust nozzle with fluidic vectoring capability without utilizing external moveable parts, which on some advanced fighter aircraft is a desired feature.

Figure 5:
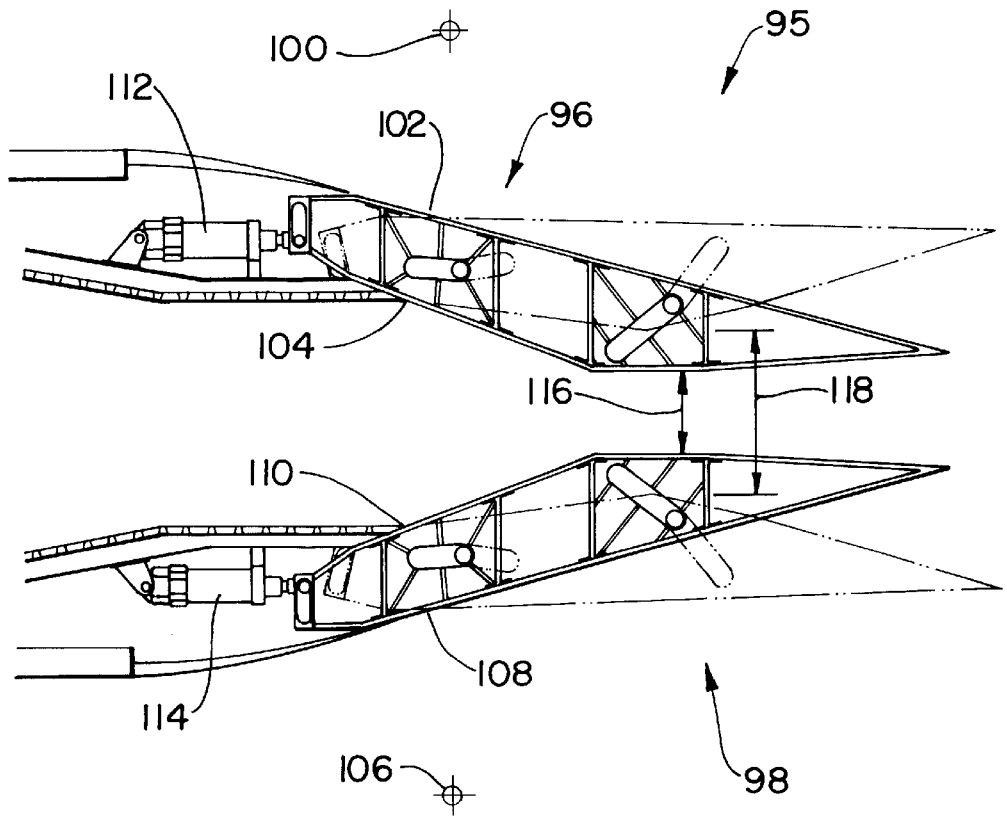
FIG. 5 is a cross sectional side view of a separate embodiment of an exhaust nozzle of the present invention, wherein the nozzle has a two variable position flaps.

In yet another separate embodiment, and as shown in FIG. 5, an exhaust nozzle 95 of the present invention is shown, which is similar to the described exhaust nozzle above, except that the nozzle utilizes a first variable position flap 96 and a second variable position flap 98 for symmetric exhaust nozzle area control. Therefore, the first variable flap 96 and the second variable flap 98 oppose each other and control the nozzle exit area.

The first variable position flap 96 has a common rotation point 100 for a first interface point 102 and a second interface point 104.

The second variable position flap 98 has a common rotation point 106 for a first interface point 108 and a second interface point 110. As the variable flaps change positions between engine cruise and engine augmentation, constant interface gaps exist between the variable flaps and a static component of the exhaust nozzle. As with the above disclosure, the common interface points provide a simple configuration for sealing the variable position flaps at the interface points with the gas turbine engine or the aircraft.

A first actuator 112 positions the first variable position flap 96 and a second actuator 114 positions the second variable position flap 98. At engine cruise, the minimum throat opening is depicted as dimension 116. At maximum engine augmentation, the maximum throat opening is depicted as dimension 118.

Figure 6:
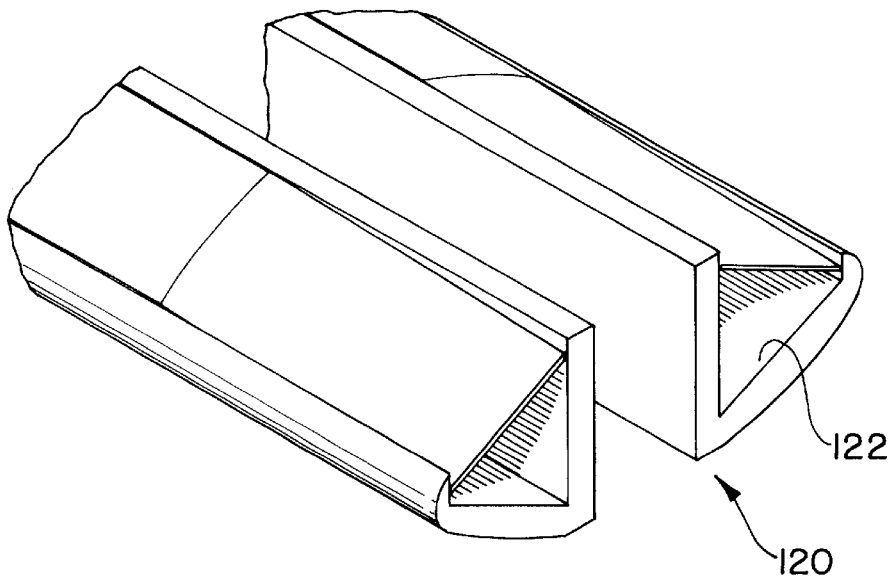
FIG. 6 is a cross sectional view of a separate embodiment of an exhaust nozzle of the present invention, wherein the exhaust nozzle passageway is triangular in shape.

A separate embodiment of the present invention is shown in FIG. 6, wherein an exhaust nozzle 120 and resulting passageway 122 are shown having a triangular configuration. Two exhaust nozzles of this configuration may be used in a dual engine aircraft, wherein the exhaust nozzles would be symmetrical to and opposite of each other, as shown in FIG. 6. The exhaust nozzle 120 is otherwise similar to the above described preferred embodiment exhaust nozzle.

In the triangular configuration nozzle, the vectored exhaust stream would conform to one or more flaps of the exhaust nozzle opposing the variable position flap or flaps. For example, in an exhaust nozzle having a triangular exhaust passageway, the vectored exhaust stream would conform to two opposing flaps when vectored by a first flap, or conversely, the vectored exhaust stream would conform to one opposing flap when vectored by two opposite flaps.

Figure 7:
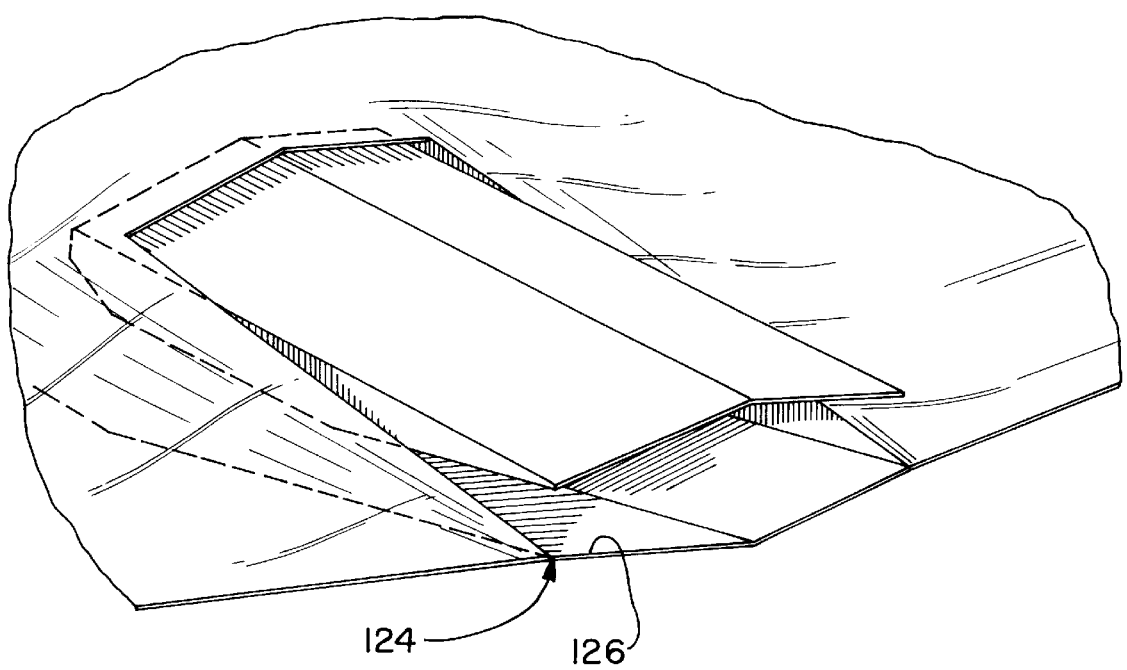
FIG. 7 is a cross sectional view of a separate embodiment of an exhaust nozzle of the present invention, wherein the exhaust nozzle passageway forms a rhombus.

A separate embodiment of the present invention is shown in FIG. 7, wherein an exhaust nozzle 124 and resulting passageway 126 are shown having a rhombus, or diamond configuration. The exhaust nozzle 124 is otherwise similar to the above described preferred embodiment exhaust nozzle.

Without listing all the geometric possibilities of the present invention, it should be understood that the present invention is not limited by the configurations shown; any polygonal exhaust stream passageway configuration could be used with the present invention.

The exhaust nozzle of the present invention provides a simple flap design that reduces the number of components required for a convergent/divergent exhaust nozzle when compared to the prior art exhaust nozzles, therefore, reducing the weight and cost of the exhaust nozzle while improving the exhaust nozzle reliability and maintainability.

The exhaust nozzle of the present invention may also be integrated with the external skin of the aircraft providing for a smooth contour of the aircraft and smooth transition between the aircraft and the engine. The variable flap is the only externally moving component. The limited number of externally moving components and a smooth transition between the engine and the aircraft, combined with vectoring by fluidics, provide for a minimum amount of drag while maximizing maneuverability, which are engine characteristics that are highly desirable in fighter aircraft.

Although this invention has been shown and described with respect to a detailed embodiment, those skilled in the art will understand that various changes in form and detail may be made without departing from the spirit and scope of the claimed invention.

What is claimed is:

1. An exhaust nozzle for a gas turbine engine, the exhaust nozzle having an exhaust stream passageway therethrough, the exhaust nozzle comprising:

a fixed flap having a convergent portion, a downstream throat portion, and a further downstream divergent portion;

a variable flap having a convergent portion, a downstream throat portion, and a further downstream divergent portion, each of the flap portions being integrated into a one piece construction, the exhaust nozzle throat area being defined by the distance between the fixed flap throat portion and the variable flap throat portion, the variable flap being pivotally mounted onto the exhaust nozzle and being rotatable about its pivotal axis to an angular position so that the exhaust nozzle throat area is variable;

at least one actuator mounted internally to the exhaust nozzle and attached to the variable flap to selectively vary the angular position of the variable flap relative to the fixed flap and so that the actuator may selectively control the exit area of the exhaust stream passageway at the exhaust nozzle throat area.

2. The exhaust nozzle of claim 1, further comprising:

a first sidewall extending vertically between the fixed flap and the variable flap;

a second sidewall opposite of the first sidewall and extending between the fixed flap and the variable flap;

the flaps and the sidewalls defining the boundaries for the exhaust stream passageway at the exhaust nozzle.

3. The exhaust nozzle of claim 1 wherein the flaps are configured so that the exhaust nozzle and the exhaust stream passageway are polygonal in shape.

4. The exhaust nozzle of claim 2 wherein the flaps and the sidewalls are configured so that the exhaust nozzle and the exhaust stream passageway are polygonal in shape.

5. The exhaust nozzle of claim 1 wherein the flaps are configured so that the exhaust nozzle and the exhaust stream passageway at the exhaust nozzle are generally rectangular in shape.

6. The exhaust nozzle of claim 2 wherein the flaps and the sidewalls are configured so that the exhaust nozzle and the exhaust stream passageway are generally rectangular in shape.

7. The exhaust nozzle of claim 1 wherein the fixed flap is structurally integrated with the airframe of the aircraft.

8. The exhaust nozzle of claim 1, wherein the variable flap maintains a constant interface gap with the exhaust nozzle as the variable flap rotates about its pivotal axis.

9. The exhaust nozzle of claim 2 further comprising:

the variable flap having an external wall and a series of internal supports between the external wall and the convergent, throat, and divergent portions, the internal supports having at least one guide track;

at least one of the sidewalls having a bearing engaging into the guide track so that when the variable flap is positioned by the actuator the variable flap travels along the path of the guide track.

10. The exhaust nozzle of claim 9 wherein the variable flap further comprises an actuator piston mount, the actuator mount having a slot so that the actuator may be fixedly attached to the exhaust nozzle and the actuator does not rotate while the actuator positions the variable flap.

11. The exhaust nozzle of claim 1, further comprising:

means for injecting high pressure air into said exhaust stream with the velocity vector of the injected air being non-parallel to the velocity vector of the exhaust stream.

12. The exhaust nozzle of claim 11, further comprising:

the exhaust nozzle having a diverging flow surface relative to the exhaust stream so that the injected high pressure air vectors the exhaust stream towards the diverging flow surface.

13. The exhaust nozzle of claim 2, further comprising:

means for injecting high pressure air into said exhaust stream with the velocity vector of the injected air being non-parallel to the velocity vector of the exhaust stream.

14. The exhaust nozzle of claim 13, further comprising:

the exhaust nozzle having a diverging flow surface relative to the exhaust stream and wherein the injected high pressure air vectors the exhaust stream towards the diverging flow surface.

15. The exhaust nozzle of claim 14 wherein the means for injecting high pressure air into said exhaust nozzle stream is accomplished by injecting high pressure compressor discharge air into at least one sidewall with the opposing sidewall further comprising a diverging flow surface relative to the exhaust stream.

16. The exhaust nozzle of claim 15, further comprising:

means for injecting high pressure air into a plenum, the plenum being adjacent to the fixed flap throat portion;

the fixed flap having a plurality of apertures connecting the plenum to the exhaust stream passageway, the apertures aligned so that when the high pressure air flows into the exhaust stream passageway, the injected air re-aligns the exhaust stream towards the diverging flow surface to enhance fluidic vectoring.

17. An exhaust nozzle for a gas turbine engine, the exhaust nozzle having an exhaust stream passageway therethrough, the exhaust nozzle comprising:

a first variable flap having a convergent portion, a downstream throat portion, and a further downstream divergent portion;

a second variable flap having a convergent portion, a downstream throat portion, and a further downstream divergent portion, each of the flap portions being integrated into a one piece construction, the exhaust nozzle throat area being defined by the distance between the first variable flap throat portion and the second variable flap throat portion, the variable flaps being pivotally mounted onto the exhaust nozzle and being rotatable about their pivotal axis to an angular position so that the exhaust nozzle throat area is variable wherein an interface location is defined between respective points on the first and second flaps and the distance between the respective points on the two flaps remains constant during motion of the flaps;

at least one actuator for each variable flap mounted internally to the exhaust nozzle and attached to the variable flaps to selectively vary the angular position of the variable flaps relative to each other and so that the actuator may selectively control the exit area of the exhaust stream passageway at the exhaust nozzle throat area.

* * * * *